United States Patent
Polizzotti et al.

(10) Patent No.: US 10,501,353 B2
(45) Date of Patent: Dec. 10, 2019

(54) MONITORING AND CONTROL OF UNIT OPERATIONS FOR GENERATING STEAM FROM PRODUCED WATER

(75) Inventors: David M. Polizzotti, Trevose, PA (US); Kevin Paul McEvoy, Schenectady, NY (US); Anthony Yu-Chung Ku, Niskayuna, NY (US); Carl Vess, Niskayuna, NY (US); Abdul Rafi Khwaja, Trevose, PA (US); Matthew Alan Petersen, Niskayuna, NY (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 1142 days.

(21) Appl. No.: 13/166,341

(22) Filed: Jun. 22, 2011

(65) Prior Publication Data

US 2012/0325744 A1 Dec. 27, 2012

(51) Int. Cl.
*C02F 1/00* (2006.01)
*C02F 1/44* (2006.01)
(Continued)

(52) U.S. Cl.
CPC .............. *C02F 9/00* (2013.01); *C02F 1/048* (2013.01); *C02F 1/24* (2013.01); *C02F 1/38* (2013.01);
(Continued)

(58) Field of Classification Search
CPC ...... B01D 17/00; B01D 21/00; B01D 21/305; C02F 1/00; C02F 1/441; C02F 1/44; C02F 1/66; C02F 1/52
(Continued)

(56) References Cited

U.S. PATENT DOCUMENTS

| | | |
|---|---|---|
| 5,084,189 A | 1/1992 | Richter |
| 5,916,991 A | 6/1999 | Chen et al. |
| (Continued) | | |

FOREIGN PATENT DOCUMENTS

| | | |
|---|---|---|
| CN | 1339409 A | 3/2002 |
| CN | 1902437 A | 1/2007 |
| (Continued) | | |

OTHER PUBLICATIONS

Unofficial English translation of Chinese Office Action issued in connection with corresponding CN Application No. 201210346573.0 dated Oct. 23, 2014.
(Continued)

*Primary Examiner* — Robert Clemente
*Assistant Examiner* — Akash K Varma (57) ABSTRACT

In a process and apparatus for treating produced water, the produced water flows through a series of treatment units. A portion of the produced water may by-pass one or more of the treatment units but the by-pass portion may be such that the treated water is still acceptable, for example for discharge or reuse. Concentrations of oil and grease, organic carbon, silica, pH or related parameters in the produced water may be monitored and used to control the process or apparatus. Control of the process may involve one or more of altering a by-pass portion, altering the addition of chemicals, and altering the operation of a unit process. The process may be controlled to respond to upset conditions, or such that the concentration of one or more limiting contaminants is near, but not over, a specified maximum for re-use or discharge.

20 Claims, 2 Drawing Sheets

(51) Int. Cl.
  C02F 9/10 (2006.01)
  C02F 1/66 (2006.01)
  C02F 1/52 (2006.01)
  C02F 9/00 (2006.01)
  C02F 1/04 (2006.01)
  C02F 1/24 (2006.01)
  C02F 1/38 (2006.01)
  C02F 5/02 (2006.01)
  C02F 1/42 (2006.01)
  C02F 101/32 (2006.01)
  C02F 103/10 (2006.01)

(52) U.S. Cl.
  CPC ............. C02F 1/441 (2013.01); C02F 1/52 (2013.01); C02F 1/66 (2013.01); C02F 5/025 (2013.01); C02F 2001/425 (2013.01); C02F 2101/32 (2013.01); C02F 2103/10 (2013.01); C02F 2209/06 (2013.01); C02F 2209/10 (2013.01); C02F 2209/20 (2013.01); C02F 2301/043 (2013.01)

(58) Field of Classification Search
  USPC ....... 210/638, 652, 687, 707, 743, 806, 739, 210/723, 774, 653, 654, 175, 294, 96.1, 210/708, 709, 96.2
  See application file for complete search history.

(56) References Cited

U.S. PATENT DOCUMENTS

| | | | |
|---|---|---|---|
| 6,248,231 | B1 | 6/2001 | Di Bella et al. |
| 6,416,672 | B1* | 7/2002 | Midkiff .................. 210/714 |
| 6,838,006 | B2* | 1/2005 | Feierabend et al. .......... 210/739 |
| 7,591,309 | B2 | 9/2009 | Minnich et al. |
| 7,597,144 | B2* | 10/2009 | Minnich et al. ............. 166/266 |
| 7,681,643 | B2* | 3/2010 | Heins ......................... 166/266 |
| 8,858,802 | B2 | 10/2014 | Polizzotti et al. |
| 2011/0147306 | A1 | 6/2011 | Polizzotti et al. |

FOREIGN PATENT DOCUMENTS

| | | |
|---|---|---|
| WO | 2007047481 A2 | 4/2007 |
| WO | 2010135020 A1 | 11/2010 |

OTHER PUBLICATIONS

Canadian Patent Application No. 2,780,570, Office Action dated Feb. 15, 2018.
Canadian Patent Application No. 2,780,570, Office Action dated Nov. 9, 2018.

* cited by examiner

MONITORING AND CONTROL OF UNIT OPERATIONS FOR GENERATING STEAM FROM PRODUCED WATER

FIELD

This specification relates to water treatment, particularly the treatment of produced water for re-use in an oil or bitumen extraction operation.

BACKGROUND

The following discussion is not an admission that anything described below is common knowledge or citable as prior art.

In some types of oil or bitumen extraction operations, steam is sent into the ground to aid in extracting the oil or bitumen. A large amount of water is required to generate the steam and finding an economically and environmentally acceptable supply of water can be difficult. At least a portion of the steam is recovered as water, called produced water, with the oil or bitumen. The produced water contains oil and other contaminants taken from the ground and would need to be treated to a permit standard before it could be discharged back into the environment. In many operations, it is therefore preferable to re-use the produced water to generate steam, which reduces the amount of water withdrawn from the environment and discharged to the environment.

For example, a steam assisted gravity drainage (SAGD) process may be used to extract bitumen from an oil sands deposit. Steam is pumped into the oil sands to make the bitumen less viscous. The treated bitumen can then be removed, with water created by the condensed steam, from an extraction well. The produced water is contaminated with, for example, oil and other organic contaminants, dissolved solids and silica. These contaminants, particularly the silica, would quickly scale up or otherwise foul any steam generating equipment if the produced water were used to produce steam directly. There is accordingly a need for economical and reliable treatments of the produced water to remove fouling contaminants. Among other difficulties, the quality of the produced water can vary over time. In particular, during upset conditions the unit operations in a treatment train can encounter variations in the concentration of one or more contaminants, particularly oil and grease, of up to an order of magnitude. The quantity of produced water can also increase over time because the ratio of produced water to oil or bitumen recovered tends to increase in time as a reservoir is worked. Because of the possibility of upsets or increases in required throughput, produced water process trains are generally over-sized relative to average or typical conditions, with the extent of the over-sizing being a balance between the cost of building and running an oversized process train compared the risk and cost of downtime or expansion if the process train can not cope with some conditions.

INTRODUCTION TO THE INVENTION

The following introduction is intended to introduce the reader to the more detailed description to follow and not to limit or define any claimed invention.

In a process and apparatus for treating produced water, at least some of the produced water flows through a series of treatment units. However, a portion of the produced water may by-pass one or more of the treatment units in an amount such that the treated water is still acceptable, for example for discharge or reuse. Concentrations of oil and grease, organic carbon, silica, pH or related parameters in the produced water may be monitored and used to control the process or apparatus. Control of the process may involve one or more of altering a by-pass portion, altering the addition of chemicals, and altering the operation of a unit process. The process may be controlled to respond to upset conditions, or such that the concentration of one or more limiting contaminants is near, but not over, a specified maximum for re-use or discharge.

The unit processes chosen for a process train may result in produced water that is unnecessarily clean in one or more respects for its intended purchase, for example reuse in a steam generation unit. By allowing a portion of the produced water to by-pass one or more treatment units, the concentration of one or more contaminants in the produced water as a whole can be adjusted to an extent not possible when all of the produced water flows through the same set of treatment units. The produced water entering the steam generation unit can be kept closer to the specified tolerances of that unit resulting in a reduced cost of operating the by-passed unit per unit of produced water entering the steam generation unit. Adding a by-pass line to an existing treatment system may allow for an increased produced water throughput without changing an existing set of by-passed treatment units.

If the portion of the produced water that is allowed to by-pass one or more treatment units is made to be variable, then the by-pass can also be used to improve the operation of the process train or possibly to respond to upset conditions. In responding to upset conditions or improving the operation of the process may also be adjusted separately or in cooperation with the by-pass adjustment. Other adjustments may include adjusting the operation of one or more units processes, whether the unit processes are partially by-passed or not, or adjusting the addition of chemicals to the produced water, whether any of the produced water by-pass any part of the process train or not. Optionally, information from sensors can be considered in making changes to the operation of the process train. One challenge in monitoring produced water treatment operations is the tendency for conventional sensors to foul when used in produced water. The treatment methods and apparatus may therefore use instrumentation that, by the nature of the sampling, is resistant to fouling by oil and grease.

A process for treating produced water for re-use in an oil or bitumen extraction operation described herein involves flowing a first portion of the produced water through an oil-water separation unit, a first water treatment unit, a second water treatment unit and a steam generating unit. A second portion of the produced water flows through the oil-water separation unit, the first water treatment unit and the steam generating unit but not, during at least some periods of time, through the second water treatment unit. The second portion may be set relative to the first portion to produce a concentration of one or more contaminants in the produced water entering the steam generating unit that is below, but close to, a specified maximum concentration for the steam generating unit. Optionally, the second portion may be varied relative to the first portion so as to provide a generally stable concentration of one or more contaminants in the produced water as it flows into the steam generating unit.

A process for treating produced water for re-use in an oil or bitumen extraction operation described herein may alternatively or additionally comprise a step of providing a process train comprising an oil-water separation unit, a first water treatment unit, a second water treatment unit and a steam generating unit connected in series but with a by-pass line around the second water treatment unit. Produced water flows through the process train but a portion of it is diverted through the by-pass line.

An apparatus for treating produced water in an oil or bitumen extraction operation described herein has a process train comprising an oil-water separation unit, a first water treatment unit, a second water treatment unit and a steam generating unit connected in series. A bypass line connects a part of the process train on an outlet side of the first water treatment unit to a part of the process train downstream of the second water treatment unit. One or more valves in the main process train or the by-pass line are operable to adjust the flow in the bypass line relative to the flow through the second water treatment unit. Optionally, one or more sensors adapted to determine the concentration of one or more contaminants in the produced water may be included at one or more locations in the process train. Further optionally, a valve controller may be connected to the valve and configured to operate the valve so as to maintain a generally constant concentration of at least one of the contaminants in produced water entering the steam generating unit.

An apparatus for treating produced water in an oil or bitumen extraction operation described herein has a process train comprising one or more treatment units. One or more sensors adapted to determine the concentration of one or more contaminants in the produced water are provided at one or more locations in the process train. The one or more sensors communicate with a controller adapted to modify the operation of the process trains. For example, the controller may be connected to a chemical feed system. Alternatively or additionally, the controller may be connected to one or more unit processes or valves, or both. The one or more valves may control flow in one or more of a drain, a recycle loop and a by-pass line.

A process for treating produced water for re-use in an oil or bitumen extraction operation described herein involves passing the produced water through one or more treatment units to remove contaminants such as oil and grease or silica. The produced water is tested at one or more locations to determine one or more of a) its pH and b) the concentration of one or more contaminants such as oil and grease, silica or total organic carbon. The test results are considered in determining one or more of a) whether to increase or decrease the addition of chemicals, such as a coagulant, a flocculant, or both, to the produced water, b) whether to adjust the pH of the produced water, c) whether to adjust the operation of a treatment unit and d) whether to adjust one or more portions of the flow of produced water.

In other aspects of one or more processes or apparatus described herein, separately or in combination with other apparatus elements or process steps described herein: an evaporator is used in parallel with a by-pass line to treat produced water; an evaporator is used to treat the reject from a reverse osmosis membrane unit treating produced water; a reverse osmosis membrane unit treating produced water is protected by a sensor and controller from receiving unacceptable feed water; a reverse osmosis membrane units is used to treat produced water to the feed requirements of a steam boiler; a ceramic or polymeric membrane unit is used to treat produced water in combination with a reverse osmosis membrane unit, an evaporator, or both; a hydrocarbon concentration in produced water flowing through a process train is estimated using an organic carbon analyzer, for example using supercritical water oxidation techniques, UV-persulfate oxidation or another method and the estimate is considered in controlling the process; concentrations of one or more contaminants in produced water flowing through a process train are determined by analyzing samples withdrawn through an automated sampling port and considered in controlling the process; a silica concentration in produced water flowing through a process train is estimated using molybdate reactive silica testing methods performed on sample of the produced water and the estimate is considered in controlling the process; the operation of a membrane filtration unit treating produced water is modified based on information indicating the concentration of one or more contaminants in the produced water flowing trough a process train; and, an existing process train treating produced water is retrofit with one or more of a by-pass line, sensors, a controller, a chemical feed system, a mechanical oil separation unit and a membrane unit.

Although the apparatus and processes will be discussed herein in relation to treating produced water from a SAGD operation for re-use in making steam, the apparatus and process may also be used for treating other forms of produced water or wastewater containing oily contaminants, whether for re-use or discharge. For example, other processes using steam to extract bitumen or other hydrocarbons from oil sands deposits such as cyclic steam stimulation (CSS) create similar produced water and the need to recycle it for steam generation. Various process to enhance recovery from conventional oil deposits also involve generating large volumes of produced water that must be treated for re-use or discharge. Hydraulic fracturing or fracing operations used to initiate or stimulate natural gas production, for example in shale gas operations, also produces large volumes of water that is contaminated with hydrocarbons, among other things, and must be treated for re-use or discharge. The "frac water" created in such an operation may also be considered to be a form of produced water.

BRIEF DESCRIPTION OF THE DRAWINGS

Embodiments of the present disclosure will now be described, by way of example only, with reference to the attached Figures.

DETAILED DESCRIPTION

Figure 1:
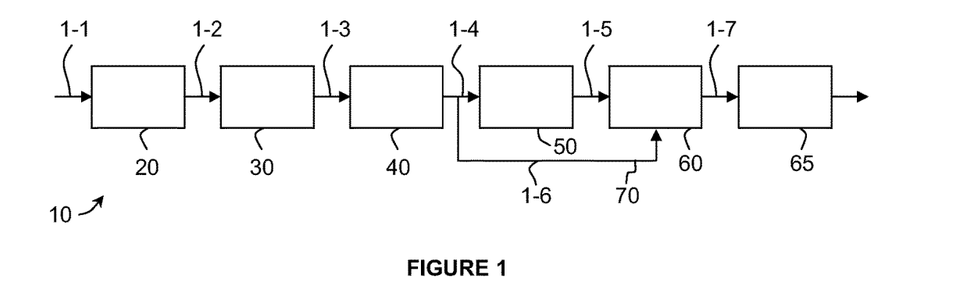
FIG. 1 is a schematic process flow diagram of a first produced water treating process train.
Figure 2:
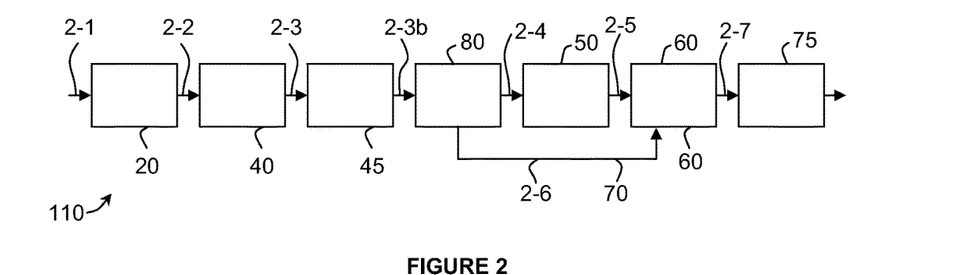
FIG. 2 is a schematic process flow diagram of a second produced water treating process train.
Figure 3:
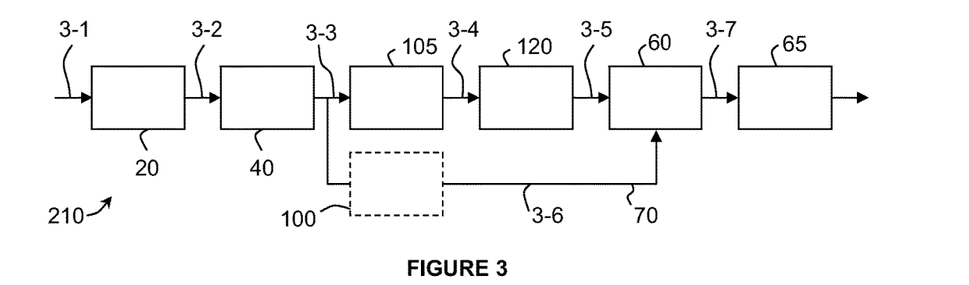
FIG. 3 is a schematic process flow diagram of a third produced water treating process train.

FIGS. 1 to 3 show three examples of produced water treating process trains which will be described in detail below. The produced water is first processed through a primary oil-water separator (not shown) upstream of the components shown in the Figures. The produced water is typically hot when extracted from the ground and, since it will be re-used to create steam, remains hot throughout the process train. For example, the produced water may have a temperature of 80 degrees Celsius or more. In the examples shown, the produced water is treated through a primary system having a secondary oil water separator (provided in the examples by a skim tank) and two or more additional treatment units in series. Various contaminants, such as suspended solids, free oil, emulsified oil, hardness, and dissolved solids, are removed. The concentration of one or more contaminants, for example total organic carbon (TOC), oil and grease (O&G), total oil, total dissolved solids (TDS) and silica, are monitored, optionally after each treatment and in a boiler feed tank. The term boiler feed tank is used for convenience and could refer to a tank, pipe, or other vessel used to hold produced water to be sent to any sort of steam generating device, such as a once through steam generator (OTSG).

A portion of the produced water by-passes one or more of the treatment units. In the examples shown, a treated water stream from the last treatment unit in the primary stream is combined with a treated water stream from the by-passed unit or units in the boiler feed tank. Optionally, the treated water stream from the by-passed unit or units may rejoin the primary stream upstream of one or more treatment units in the primary stream. The water in the boiler feed tank is fed to a steam generating device to produce steam. The examples are particularly applicable to a heavy oil extraction process such as SAGD in which the produced water is treated and used to generate steam for reinjection into the subsurface oil or bitumen bearing formation.

Process trains for treating produced water may be created from a combination of treatment units or process. The treatment units are primarily directed at removing residual hydrocarbons and other organics, and inorganic species such as silica from the produced water. Some options for treatment units include for example: a skim tank; an induced gas flotation (IGF); induced static flotation (ISF); ceramic membranes; electro-coagulation; a hydrocyclone; polymeric membranes; absorbent filters; sand filters; oil removal filters such as walnut shell filters; warm lime softeners; nanofiltration and reverse osmosis membranes; and, thermal evaporators.

Steam generating units include, for example, an OTSG or a drum boiler. The steam generating unit is typically associated with specified minimum concentrations of contaminants, for example TOC, TDS, silica and oil and grease, that can be present in its feed water. In general, an OTSG is more tolerant of oil and TDS in the feed stream compared to a drum boiler, but still typically requires reductions in silica and residual oil concentrations in the produced water. A drum boiler requires even further reductions in silica and residual oil, and also requires removal of TOC and TDS from the produced water. The OTSG is used more frequently in SAGD operations. However, a drum boiler is more energy efficient than an OTSG and so the example of FIG. 2 describes a process train for use with a drum boiler.

Referring to FIG. 1, a first process train 10 begins with a skim tank 20, followed by an IGF unit 30, followed by a ceramic membrane 40. After passing through these treatment units, residual oil is removed to a concentration below the limits of an OTSG 65, but the concentration of silica is still too high. A portion of the produced water is passed through an evaporator 50 before being collected in a boiler feed tank 60. The evaporator removes essentially all of the silica from the produced water passing through it. However, an OTSG is typically specified to be able to operate under exposure to some concentration of silica, for example 50 mg/L. A by-pass line 70 carries a portion of the produced water from the outlet of the ceramic membrane 40 directly to the boiler feed tank 60. The portion of the produced water flowing in the by-pass line 70 is chosen to provide a silica concentration in the boiler feed tank 60 that is near, but nor more than, the specified silica limit for an OTSG 65. For example, the silica concentration in the boiler feed tank 60 may be between 75% and 100% of the specified maximum concentration of the applicable steam generating unit.

The concentrations of various contaminants at points in the first process train designated 1-1 through 1-7 are shown in Table 1 below. A flow of 100 gallons per minute (gpm) was used to simplify calculations, although the flows in a full scale process train would be much larger. As shown in Table 1, 70% of the produced water by-passes the evaporator. The resulting silica concentration in the boiler feed tank is 49 mg/L which is below the maximum concentration (50 mg/L) specified for the OTSG 65. The evaporator is only required to process 30% of the produced water, which results in a significant energy and capital savings compared to having an evaporator designed and operated to treat all of the produced water.

Referring to FIG. 2, a second process train 110 has a skim tank 20, a ceramic membrane unit 40, a silica removal unit 45, and a reverse osmosis (RO) membrane unit 80. The silica removal unit 45 may also be located upstream of the ceramic membrane unit 40 and may be, for example, any of the particular treatment units described in relation FIG. 1, 3 or 4 for removing silica. The RO unit 80 produces a retentate stream 2-4 and a permeate stream 2-6. The RO retentate portion of the produced water is passed through an evaporator 50 before being collected in a boiler feed tank 60. A by-pass line 70 carries the RO permeate portion of the produced water from the permeate outlet of the ceramic membrane 40 directly to the boiler feed tank 60.

The concentrations of various contaminants at points in the second process train designated 2-1 through 2-7 are shown in Table 2 below. As shown in Table 2, 66% of the produced water by-passes the evaporator 50. Both the evaporator 50 effluent and the RO membrane unit 80 permeate have a TDS concentration meeting the boiler feed water specification, as well as silica and TOC concentrations well below the boiler feed water specification. The evaporator 50 is only required to process 34% of the produced water. Although energy is required to operate the RO unit 80, a greater amount of energy is saved by by-passing the RO permeate around the evaporator.

The produced water passing through the evaporator 50 and the produced water permeated through the RO membrane unit 80 may both be acceptable for feeding to the boiler 75. However, fouling and permeate quality in the RO membrane unit 80 are related to the recovery rate, among other things, and the recovery rate in turn determines the portion of the produced water that is sent as permeate through the by-pass line 70. The portion of the produced water flowing in the by-pass line 70 may be chosen to provide the highest recovery rate that provides acceptable performance given the contaminant levels in the feed water. If contaminant levels in the feed water rise, the recovery rate may be lowered and the portion of the produced water passing through the by-pass line 70 is reduced.

Referring to FIG. 3, a third process train 210 begins with a skim tank 20, followed by a ceramic membrane 40. After passing through these treatment units, the concentration of silica is too high for an OTSG 65. A portion of the produced water passes through a warm lime softening (WLS) unit 105 and an ion exchange unit 120, for example a weak acid cation exchange (WAC) unit, before being collected in a boiler feed tank 60. The WLS 105 may be operated to remove silica by feeding MgO into the WLS 105. The ion exchange unit 120 may also be used to remove silica by using both anion and cation exchange resins, rather than a WAC only unit. Optionally, the WLS 105 or ion exchange unit 120 or both may be operated to remove essentially all of the silica from the produced water. In that case, a by-pass line 70 may be used to carry a portion of the produced water from the outlet of the ceramic membrane 40 directly to the boiler feed tank 60. The portion of the produced water flowing in the by-pass line 70 is chosen to provide a silica concentration in the boiler feed tank 60 that is near but not more than the specified silica limit for the OTSG 65. An additional treatment unit may be added to the by-pass line 70 to reduce the concentration of any other contaminant that might otherwise exceed the specification for the OTSG 65. For example, an oil removal filter (walnut shell filter) (ORF) 100 may be used to remove oil and grease in the by-pass line 70.

The concentrations of various contaminants at points in the first process train designated 3-1 through 3-7 are shown in Table 3 below. As shown in Table 3, 50% of the produced water by-passes the WLS 105 and ion exchange unit 120. The resulting silica concentration in the boiler feed tank is 50 mg/L which the maximum specified for the OTSG 65. WLS 105 and ion exchange unit 120 are only required to process 50% of the produced water, which may allow for more efficient operation of the WLS 105 and ion exchange unit 120 in meeting the OTSG 65 feed specifications. Even though the amount of MgO required to combine with a given amount of silica in the produced water may be essentially constant in theory, a WLS 105 or ion exchange unit 120 in an existing treatment plant may be operated to remove essentially all of the silica in all of the produced water passing through them. Adding a by-pass line 70 may allow for a decrease in chemical consumption, or an increase in throughput, for an existing plant. As an alternative, if silica detection sensors are added as will be described below, the rate of feeding MgO into a WLS 105 may be varied considering the silica concentration upstream or downstream, or both, of the WLS 105. The amount of MgO fed to the WLS 105 may be chosen to remove the amount of silica required to produce feed water to the OTSG 65 without a by-pass line 70, with a by-pas line 70 carrying a generally fixed portion of the total plant throughput, or in combination with adjustments to the flow in the by-pass line 70.

To improve operation of a water treatment system, or to respond to upsets, the operation of the process trains 10, 110, 210 and 310 (to be described below) can be modified over time based on information from one or more sensors. Operational modifications may include one or more of a) increasing or decreasing the addition of chemicals, such as a coagulant, a flocculant, or both, to the produced water, b) adjusting the pH of the produced water, c) adjusting the operation of a treatment unit and d) adjusting one or more portions of the flow of produced water in the process train.

Regarding upsets in the form of increased concentrations of hydrocarbons in the produced water, an on-line monitoring sensor such as a TOC analyzer or O&G sensor can be deployed after the primary oil-water separator to detect the onset of upset conditions and trigger adjustment of the downstream operations. If an upset is detected, the operation of individual processes can be adjusted to compensate for higher contaminant concentrations. The adjustments may allow the treatment unit to better resist fouling, or to increase its contaminant removal ability. For example, the residence time in a skim tank 20 can be increased, chemicals can be added to various treatment units or to the produced water, and backpulse frequencies or recycle rates can be adjusted in membrane systems. With the ceramic membranes 40, fouling during an upset can be reduced by one or more of: increasing the cross flow velocity (CFV); decreasing the transmembrane pressure (TMP); injecting chemicals that inhibit adsorption of hydrocarbons or other organics; increasing the frequency or pressure of backpulses; increasing the cleaning frequency; and, decreasing the recovery rate. Although the upset conditions may require action to control fouling rates, the oil and gas concentration in the permeate from ceramic membranes 40 tends to remain below the maximum specified for an OTSG 65 even when challenged by upset conditions. In some treatment systems, reducing the flow rate in the by-pass line 70 may also be effective in responding to upsets, particularly if any of the optionally by-passed treatment units are effective at removing oil and grease.

To optimize the energy or chemical consumption of a process train 10, 110, 210, 310, the flow rate in the by-pass pass line 70 can be adjusted such that the contaminant that is usually closest in concentration to the limits of the boiler 75 or OTSG 65 (the limiting contaminant) is maintained at, or slightly below, the relevant specification. If required to respond to an increase or upset in the concentration of the limiting contaminant, or in another contaminant that temporarily exceeds the specifications of the steam generating unit 65, 75 and can be treated by a by-passed treatment unit, the flow rate in the by-pass line 70 can be reduced. Since the by-pass line carries a higher concentration of at least one contaminant, reducing the by-pass flow typically improves the quality of the water in the boiler feed tank 60. The operation of the normally by-passed treatment unit may need to be adjusted to compensate for an increase in flow when the flow rate in the by-pass line is reduced.

For example, in a system where silica concentration controls the amount of produced water that can flow through the by-pass line 70, a silica concentration sensor in the boiler feed tank 60 can be used to control a valve diverting produced water to the by-pass line automatically or through the actions of a plant operator. In a sample control method, if the silica concentration in the boiler feed tank 60, or in a pipe carrying a blend of by-pass and by-passed flows to the boiler feed tank 60, reaches the specified limit of the steam generating unit then the by-pass flow is reduced by an estimated amount, for example 10%. If the silica concentration in the boiler feed tank 60 drops to below a set point, for example 75% of the specified tolerance of the steam generating unit, then the by-pass flow is increased by an estimated amount, for example 10%. Based on past performance, the estimated valve movements may be adjusted. In another control method, silica concentration sensors are placed in the by-pass line 70 and at the outlet of the last by-passed treatment unit. Using signals from the silica sensors and flow rate information, a controller calculates the silica concentration of an aggregate of all the by-pass and by-passed streams. One or more valves in the by-pass line 70, or otherwise operable to control the flow rate in the by-pass line, are adjusted by the controller to produce a silica concentration for the aggregate flow stream that is at or below the specified limits of the steam generating unit. According to any of these control methods, the adjustments can be made in essentially real time, or according to a step function to avoid having to make constant adjustments to the operation of the by-passed treatment unit.

The contaminants in the produced water are preferably monitored using fouling-resistant online or pseudo-online sensors. One or more contaminants, for example TOC, TDS or silica concentration may be monitored at one or more points in the process train. The sensors may detect qualities of produced water located in a pipe or tank, or produced water that has been withdrawn from a pipe or tank, for example through an automatic sampling device connected to a sampling port in the pipe or tank. For example, a remote sensor can be integrated with an Autosampler™, or with a complete Integrated On-Line Sampling System, both available from GE Analytical Instruments.

Fouling is a concern for on-line monitoring of produced water since it contains oil and other organic compounds. The process streams 11, 110, 120 use sensors, optionally including automated sampling probes as described above, that are resistant to fouling. For example, the oil content of the produced water can be determined using an organic carbon analyzer. In particular, a TOC analyzer using a supercritical water oxidation technique known as the Sievers InnovOx™ laboratory analyzer is available from GE Analytical Instruments. The TOC analyzer measures concentrations of dissolved organics and colloidal hydrocarbons which can be correlated with oil content. Oil content can also be measured by another type of InnovOx™ analyzer which measures non-purgeable organic carbon (NPOC). UV fluorescence or by infrared analysis such as FTIR can also be used to measure a proxy for oil content using samples drawn from an automated sampling port. Other fouling resistant sensing techniques that measure colloidal organics can also be correlated to oil content and include focused acoustics (ultrasound), image analysis, light scattering and turbidity, photoacoustics, and laser induced fluorescence. Further methods to determine oil content by way of samples withdrawn from an automated sampling port include UV absorption, total petroleum hydrocarbons (TPH), in which hydrocarbons are separated on a gas chromatograph and quantified using flame ionization detection (FID), and total oil and grease (TO&G) analysis measuring organic compounds soluble in hexane, which excludes asphaltenes. These techniques can be used individually, or in various combinations of two or more techniques, to obtain the data necessary to make control decisions.

Silica concentration can be measured in produced water samples withdrawn through one or more automated sampling ports. Samples withdrawn upstream of treatment unit that remove suspended solids and/or color, for example ceramic or RO membranes, may need to be filtered or diluted before they are analysed to remove non-soluble silica (if the concentration of soluble silica only is intended) or any color or turbidity in the produced water that would materially interfere with the analysis. The samples can be analyzed for molybdate-reactive silica concentration, which approximates total silica concentration. Molybdate-reactive silica testing methods are described, for example, in ASTM D859-10 Standard Test Methods of Silica in water. In brief, a sample is mixed with a reagent such as heteropoly blue, its color is determined with a colorimeter or photometer, and the meter reading is compared to a chart comparing colors with silica concentration. The colorimeter or photometer may be connected to a computer or programmable logic controller based control system that is linked to or including one or more valve controllers. The meter reading is thus automatically converted into a silica concentration data point that is input into a control algorithm. Samples are withdrawn, mixed with reagent, and tested in a meter at regular polling intervals resulting in a stream of silica concentration values produced in a pseudo-online manner.

Total inorganics can be monitored by way of online TDS (conductivity) or pH sensors, or approximated based on silica measurements. Inorganic and organic suspended solids concentrations can be measured by way of turbidity sensors. Where a monitoring technique does not directly correlate to the target contaminant, multiple monitoring techniques may be used to increase the accuracy or reliability of the measurement.

Sensors used to determine oil concentrations can be calibrated, initially and periodically during use, to determine total oil and grease (O&G) concentrations by EPA 1664a or equivalent methods performed in order to establish and maintain the relationship between the monitored parameter and O&G concentration. The impact of spatial and temporal oil content compositional changes on the measured parameter is accounted for through the calibration procedure.

Figure 4:
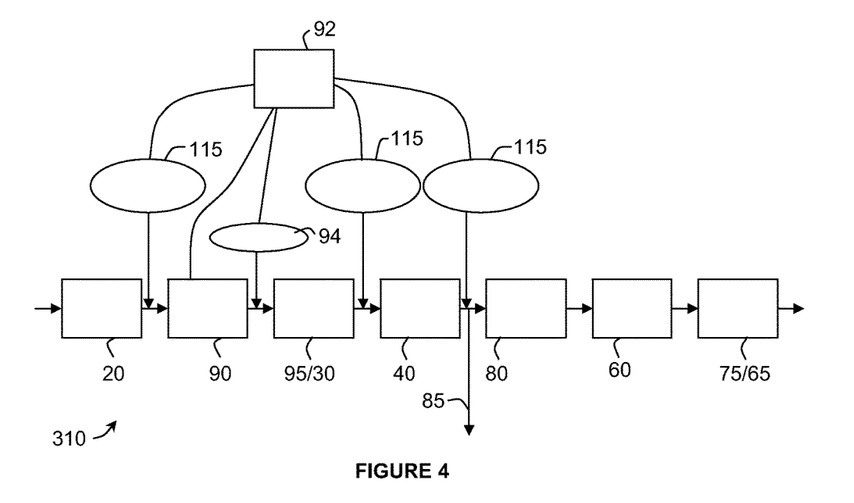
FIG. 4 is a schematic process flow diagram of a fourth produced water treating process train.

FIG. 4 shows a fourth process train 310. Produced water exiting from a primary oil separator (not shown) comes into a skim tank 20 and then flows into a chemical feed system 90. One or more chemicals such as coagulants or flocculants, or both, are added to the produced water by the chemical feed system 90 according to instructions received through a controller 92. The chemical feed system 90 may also be able to introduce basic or acidic solutions into the produced water to allow the pH of the produced water to be adjusted. The produced water then flows into either an induced gas flotation (IGF) unit 30 or a centrifugal separator unit 95. The centrifugal separator unit 95 uses centrifugal forces in a vortex created in a tube to move less dense fluids containing oil into the center of the tube for removal through a conduit located on the tube axis. A suitable device is described, for example, in U.S. Pat. Nos. 5,084,189 and 6,248,231 and produced by Enviro Voraxial Technology of Fort Lauderdale under the trade mark VORAXIAL. The centrifugal unit 95, or other type of mechanical oil separation unit may also be used in place of the IGF unit 3 in FIGS. 1 to 3. Other types of mechanical oil separation units include entrapped air flotation, dissolved air flotation, hydrocyclonic separators, gravity filters, and API separators. The produced water leaving either of these units then flows into a ceramic membrane unit 40. The ceramic membrane unit 40 in any of FIGS. 1 to 4 preferably contains ultrafiltration (UF) membranes and, optionally, may be replace by a membrane unit comprising polymeric UF membranes. The permeate from the ceramic membrane unit 40 flows into an RO membrane unit 80. The permeate from the RO membrane unit 80 flows into a boiler feed water tank 60, which provides make-up water for a drum boilers 75 or OTSG 65. As described in FIG. 2, the retentate from the RO membrane unit 80 may be treated in an evaporator 50 (not shown) and also fed to the boiler feed water tank 60. There may also be a drain line 85 between the ceramic membrane unit 40 and the RO membrane unit 80. The drain line 85 is controlled by a valve and may be connected to a drain or, optionally, recycled upstream.

A sensor package 115 is provided at one or more of the positions indicated in FIG. 4. The sensor package 115 includes one or more of a TOC analyzer, and oil & grease analyzer, a silica analyzer, and a turbidity analyzer. The analyzer may comprise equipment as described above for determining concentrations of the relevant contaminants on a real time, near real time, or regularly polled basis. The sensor package 115 may also include a pH probe. Preferably, multiple sensor packages 115 are used. For example, in FIG. 4 sensor packages 115 are placed between the IGF or centrifugal separator unit 95, 30 and the ceramic membrane unit 40, between the skim tank 20 and chemical feed system 90, and between the ceramic membrane unit 40 and the RO membrane unit 80. An additional pH probe 94 is also placed between the chemical feed system 90 and the IGF or centrifugal separator units 95/30.

The sensor packages 115 measure the TOC, turbidity, O&G or silica values in the influent to the chemical feed system 90 and the effluent stream of the IGF unit 30 or centrifugal separator unit 95, or the permeate from the ceramic membrane unit 40. Based for example on the values detected in the effluent of IGF or centrifugal separator unit 95, 30 a feed back control loop is implemented in the controller 92. The controller 92 instructs the chemical feed system 90 to increase or decrease the dosage of one or more chemicals, for example coagulants or flocculants. The pH probe 94 on the effluent side of the IGF or centrifugal separator unit 95, 30 also provides a signal to the controller 92 to be considered in operating the chemical feed system 90. The information from the pH probe 94, along with pH information from one the sensor package 115 between the skim tank 20 and chemical feed system 90 is used to adjust an acid or caustic dosage in the chemical feed system 90 to achieve a desired pH in the produced water, for example a pH of 5 or less or 3.5 or less. The chemical dosage for coagulants or flocculants can be adjusted as required to achieve a required percentage reduction, or resulting concentration, of one or more contaminants such as O&G, silica or TOC. For example, a required percent reduction value can be calculated using information from the sensor package 115 between the skim tank 20 and the chemical feed system 90 and between the IGF or centrifugal separator unit 95, 30 and the ceramic membrane unit 40, and chemicals may be dosed according to a predetermined table or formula predicted to produced the required percentage reduction. In an alternative method, a specification can be set for a contaminant in the produced water at a particular point in the third process train 310 and the sensor package 115 at or near that location can be used to provide information on whether the concentration of the contaminant is above or below the desired value. The chemical feed system 90 is instructed to increase or decrease the chemical dosage in steps until the desired value is achieved within an acceptable tolerance, for example 5% or 10%.

Optionally, the controller 92 may compare readings from a sensor package 115 between the ceramic membrane unit 40 and the RO membrane unit 80 to feed specifications or tolerances of the RO membrane unit 80. If the concentrations of contaminants in the produced water exceed the feed water specifications for the RO membrane 80, a signal may be sent from the controller 92 to open a valve in the drain line 85 to prevent produced water from entering the RO membrane unit 80 until adjustments are made, for example in the chemical feed system 90, to produce acceptable feed water quality. The RO membrane unit 80 in FIG. 4 is used to provide feed water suitable for use in a drum boiler 75, but might not be required if an OTSG 65 is used. Alternatively, a by-pass line 70 may be provided around the reverse osmosis unit 80, or an evaporator 50, as shown in FIG. 1 if an OTSG 65 is used.

Examples of chemicals that can be used in the chemical feed system 90 are described in U.S. patent application Ser. No. 12/641,528 and in U.S. patent application Ser. No. 12/641,542, both filed on Dec. 18, 2009 both of which are incorporated herein by this reference to them. These chemicals include various polymers, coagulants and flocculants that can be added to the produced water in various combinations or sequences. Further examples include cationic coagulants such as poly EPI/DMA, cationic acrylamide copolymer flocculants, activated starch and maleanamate derviatized starch, or combinations of them, as described in published PCT application WO 2007/047481 and tannin derived polymers as described in U.S. Pat. No. 5,916,991.

Figure 5:
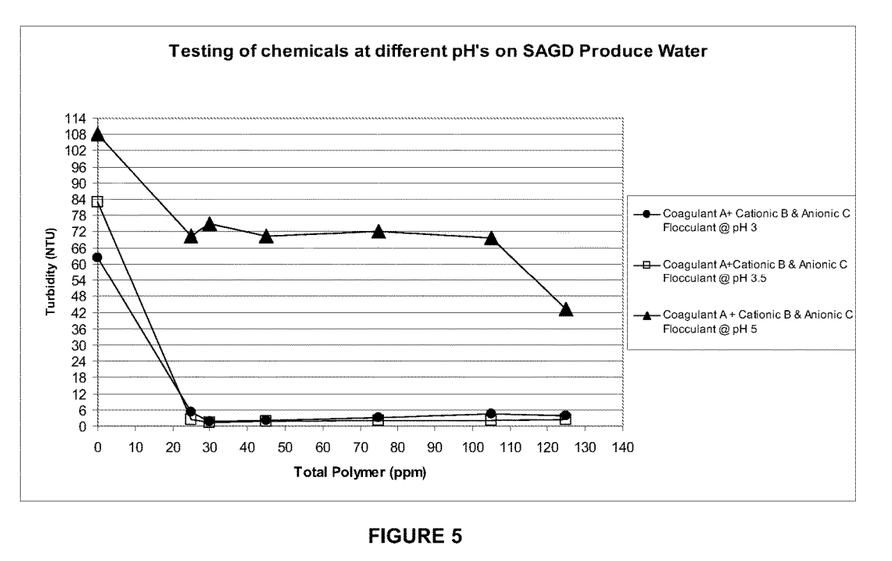
FIG. 5 is a chart showing results of jar tests involving the addition of coagulants and flocculants to produced water.

FIG. 5 shows the results of various jar tests. A sample of produced water from a SAGD operation was obtained and split into numerous beakers. The pH of the various samples was adjusted as indicated in FIG. 5. Coagulant A, Cationic Flocculant B and Anionic Flocculant C were then added in sequence to the total (combined) polymer dosages indicated in FIG. 5. Coagulant A was a cationic polymer solution comprising EPI/DMA called AquiClear CL 1000 produced by Aquial LLC of Chesterfield, Mo. Cationic B was a mixture comprising a polysaccharide and a cationic polyacrylamide polymer called AquiClear CH 1100 also produced by Aquial LLC. Anionic C was a mixture comprising activated starch and polyacrylamide called AquiClear AH 1100 also produced by Aquial LLC. After stirring the samples and then allowing them to settle, the turbidity of the water over the settled flocs was measured and recorded in FIG. 5. Further tests involving these chemicals are described in U.S. patent application Ser. No. 12/641,528 and demonstrate removal of silica, oil and grease, COD and TOC from produced water samples.

FIG. 5 shows that after adjusting the pH of the produced water to 5, the total polymer dosage, which is the sum of the dosages of Coagulant A+Cationic Flocculant B+Anionic Flocculant C, reduced the turbidity of the sample from 108 NTU at 0 ppm total polymer dosage to 42 NTU at about 125 ppm total polymer dosage. FIG. 5 also shows that by decreasing the pH of the sample to pH 3.5 by adding acid and adjusting the total polymer dosage, the turbidity of the sample decreased from 84 NTU to 3 NTU at about 25 ppm total polymer dosage. Accordingly, a desired reduced in turbidity is likely to be obtained by one or both of a variation in the pH or polymer dosage.

In the process described in relation to FIG. 4, control of the chemical feed system 90 considers both pH and polymer dose adjustments to achieve a desired result in the produced water. For example, to reduce contaminant concentrations in the produced water, acids and polymer may be added together or in sequence until the desired result is obtained. One or more sensor packages 115 or pH probes 94, a controller 92 and chemical feed system 90 may similarly be added to any of the examples of FIGS. 1 to 3 to provide additional means and methods for treating the produced water.

The systems and processes described above are intended to be examples only, but to provide at least one example of an embodiment of each claimed invention. However, it is possible that a particular system or process described above might not be an embodiment of a particular claim. Alterations, modifications and variations can be effected to the particular examples by those of skill in the art without departing from the scope of the claims appended hereto.

TABLE 1

| Stream | Flow gpm | TDS mg/L | Silica mg/L | TOC mg/L | O&G mg/L |
|---|---|---|---|---|---|
| Range | | 2 to 11K | 220 to 500 | | |
| 1 | 100 | 5000 | 70 | | 1000 |
| 2 | 100 | 5000 | 70 | 300 | 100 |
| 3 | 100 | 5000 | 70 | 250 | 10 |
| 4 | 30 | 5000 | 70 | 250 | 1 |
| 5 | 30 | 5000 | 0 | 0 | 1 |
| 6 | 70 | 5000 | 70 | 250 | 1 |
| 7 | 100 | 5000 | 49 | 175 | 1 |
| BFW spec | | 8000 | 50 | 2500 | 1 |

TABLE 2

| Stream | Flow Gpm | TDS mg/L | Silica mg/L | TOC mg/L | O&G mg/L |
|---|---|---|---|---|---|
| Range | | 2 to 11K | 220 to 500 | | |
| 1 | 100 | 5000 | 70 | | 1000 |
| 2 | 100 | 5000 | 70 | 300 | 100 |
| 3 | 100 | 5000 | 70 | 250 | 1 |
| 3b | 100 | 5000 | 10 | 250 | 1 |
| 4 | 34 | 15000 | 30 | 750 | 0 |
| 5 | 34 | 20 | 0 | 0 | 0 |
| 6 | 66 | 20 | 0 | 0 | 0 |
| 7 | 100 | 20 | 0 | 0 | 0 |
| BFW spec | | 20 | 8 | 250 | 0 |

TABLE 3

| Stream | Flow Gpm | TDS mg/L | Silica mg/L | TOC mg/L | O&G mg/L |
|---|---|---|---|---|---|
| Range | | 2 to 11K | 220 to 500 | | |
| 1 | 100 | 5000 | 100 | | 1000 |
| 2 | 100 | 5000 | 100 | 300 | 100 |
| 3 | 50 | 5000 | 100 | 250 | 10 |
| 4 | 50 | 5000 | 0 | 250 | 1 |
| 5 | 50 | 5000 | 0 | 0 | 1 |
| 6 | 50 | 5000 | 100 | 250 | |
| 7 | 100 | 5000 | 50 | 125 | |
| BFW spec | | 8000 | 50 | 2500 | 1 |

We claim:

1. A process for treating produced water comprising the steps of:
   a) flowing the produced water through an oil water separation unit;
   b) downstream of step a) flowing the produced water through a first water treatment unit;
   c) downstream of step b), splitting the produced water into a first portion of the produced water and a second portion of the produced water, wherein the first portion of the produced water has a concentration of silica, and the second portion of the produced water has a concentration of silica, and the concentration of silica in the first portion of the produced water is the same as the concentration of silica in the second portion of the produced water;
   d) flowing the first portion of the produced water through an evaporator to produce a condensate and flowing the condensate to a steam generating unit; and,
   e) flowing the second portion of the produced water to the steam generating unit but not through the evaporator, wherein the concentration of silica in the second portion of the produced water exceeds a maximum concentration of silica of the steam generating unit.

2. The process of claim 1,
   wherein the condensate enters the steam generating unit at a first flow rate,
   wherein the second portion of the produced water enters the steam generating unit at a second flow rate,
   wherein the flow rate of the second portion relative to the flow rate of the condensate is such that the concentration of the silica in the combination of the condensate and the second portion of the produced water entering the steam generating unit is between 75% and 100% of a specified maximum concentration of the silica for the steam generating unit.

3. The process of claim 1, wherein the condensate flows into the steam generating unit at a first flow rate, and wherein the second portion of the produced water flows into the steam generating unit at a second flow rate, the process further comprising a step of varying the flow rate of the second portion relative to the flow rate of the condensate so as to provide a generally stable concentration of the silica in the combination of the condensate and the second portion of the produced water as it flows into the steam generating unit.

4. The process of claim 1, wherein the condensate reaches the steam generating unit at a first flow rate, and wherein the second portion of the produced water reaches the steam generating unit at a second flow rate, the process further comprising steps of a) determining the concentration of the silica in the combination of the condensate and the second portion of the produced water reaching the steam generating unit at a first time; and, b) modifying the flow rate of the second portion relative to the flow rate of the condensate so as to produce a change in the concentration towards a specified value or range of the concentration at a second time.

5. The process of claim 4 wherein determining the concentration of the silica in the combination of the condensate and the second portion of the produced water reaching the steam generating unit comprises one or more of a) determining the concentration of the silica in a mixture of the condensate and the second portion in a pipe or tank containing the mixture flowing to the steam generating unit; and, b) determining a flow rate weighted average of the concentrations of the silica in the first portion, the second portion and any other flows of produced water flowing to the steam generating unit.

6. The process of claim 4 wherein the specified value or range of the concentration is a range between 75% and 100% of a specified maximum concentration of the silica for the steam generating unit.

7. The process of claim 6 wherein the specified value or range of the concentration is a range between 90% and 100% of a specified maximum concentration of the silica for the steam generating unit.

8. The process of claim 4 wherein the silica is soluble silica.

9. The process of claim 8 wherein the concentration of the silica is measured in a sample withdrawn from a sampling port and tested using a molybdate reaction method.

10. The process of claim 1,
    wherein the condensate enters the steam generating unit at a first flow rate,
    wherein the second portion of the produced water enters the steam generating unit at a second flow rate,
    further comprising a step of considering information from a sensor measuring a concentration of silica in the produced water upstream of the first treatment unit in estimating a required change in the flow rate of the second portion relative to the flow rate of the condensate.

11. The process of claim 1 further comprising a step of considering information from a sensor measuring a concentration of silica in the produced water upstream of the first treatment unit in estimating a required change in the operation of one of the treatment units.

12. A process for treating produced water comprising the steps of:
    a) providing a process train comprising an oil-water separation unit, a first water treatment unit, a second water treatment unit and a steam generating unit;
    b) providing a by-pass line around the second water treatment unit in the process train;
    c) flowing produced water through the process train;

d) diverting a portion of the produced water through the by-pass line; and, e) mixing produced water diverted through the bypass line with produced water flowing from the second water treatment unit to the steam generating unit, wherein the produced water includes a contaminant at a concentration, the steam generating unit has a specified maximum concentration of the contaminant, the produced water diverted through the bypass line has a concentration of the contaminant greater than the specified maximum concentration, and wherein the portion of the produced water diverted through the by-pass line is such that, upon mixing the produced water diverted through the bypass line with the produced water flowing from the second water treatment unit to the steam generating unit, the concentration of the contaminant in the mixture of produced water is between 75% and 100% of the specified maximum concentration of the contaminant for the steam generating unit.

13. The process of claim 12 wherein the portion of the produced water diverted through the by-pass line is varied to provide a generally stable concentration of the contaminant in the mixture of produced water flowing into the steam generating unit over a period of time wherein the concentration of the contaminant varies in the produced water flowing into the oil water separation unit.

14. An apparatus for treating produced water that includes a contaminant at a concentration, the apparatus comprising:

a) a process train comprising an oil-water separation unit, a first water treatment unit, a second water treatment unit and a steam generating unit connected in series;

b) a bypass line connecting a part of the process train on an outlet side of the first water treatment unit to a part of the process train downstream of the second water treatment unit and upstream of the steam generating unit, wherein all of the water flowing to the steam generating unit flows from the part of the process train on the outlet side of the first water treatment unit through either the bypass line or the second water treatment unit;

c) a valve operable to adjust a flow in the bypass line relative to a flow through the second water treatment unit;

d) one or more sensors adapted to determine the concentration of the contaminant in the produced water at one or more locations in the process train; and e) a valve controller connected to the valve wherein the valve controller is configured to operate the valve so as to maintain a generally constant concentration of the contaminant in produced water entering the steam generating unit.

15. The apparatus of claim 14 wherein the contaminant is silica.

16. The apparatus of claim 15 wherein the one or more sensors comprise an automatic sampling port, a molybdate reaction vessel and an online colorimeter or photometer.

17. The apparatus of claim 16 further comprising an oil sensor to determine a concentration of oil, organic carbon turbidity, total dissolved solids, or silica, in the produced water upstream of the first treatment unit.

18. The apparatus of claim 17 wherein the oil sensor is a total organic carbon or non-purgeable organic carbon analyzer.

19. The apparatus of claim 17 wherein the oil sensor is connected so as to transmit signals to the valve controller.

20. The apparatus of claim 17 wherein the oil sensor is connected to a controller for one of the treatment units.

* * * * *